(12) United States Patent
Kumura et al.

(10) Patent No.: US 6,482,120 B2
(45) Date of Patent: Nov. 19, 2002

(54) LINK CONNECTING STRUCTURE OF FRICTION WHEEL CONTINUOUSLY VARIABLE TRANSMISSION

(75) Inventors: Haruyoshi Kumura, Fujisawa; Toshikazu Oshidari, Yokosuka; Kazuhisa Sasahara, Chigasaki, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/108,703

(22) Filed: Mar. 29, 2002

(65) Prior Publication Data

US 2002/0098939 A1 Jul. 25, 2002

Related U.S. Application Data

(62) Division of application No. 09/527,464, filed on Mar. 17, 2000.

(30) Foreign Application Priority Data

Mar. 19, 1999 (JP) .......................................... 11-076146

(51) Int. Cl.[7] ............................................... F16H 15/38
(52) U.S. Cl. ........................................... 476/40; 476/46
(58) Field of Search .............................. 476/40, 41, 42, 476/45, 46

(56) References Cited

U.S. PATENT DOCUMENTS

| 4,955,246 A | 9/1990 | Nakano |
| 5,885,185 A | 3/1999 | Kidokoro et al. |

FOREIGN PATENT DOCUMENTS

| JP | 9-291997 | 11/1997 |
| JP | 9-317837 | 12/1997 |

*Primary Examiner*—William C Joyce
(74) *Attorney, Agent, or Firm*—Foley & Lardner

(57) ABSTRACT

A pair of friction wheels gripped between an input disk and output disk facing each other on a rotation shaft of a friction wheel continuously variable transmission, are supported by a pair of supporting members each comprising a supporting shaft. An end of the supporting shaft of one supporting member and an end of the supporting shaft of another supporting member are joined by a link. The center of the link is supported free to pivot by a pin. The link supports the supporting member against an outward force exerted by the input disk and output disk on the friction wheels in a direction away from the rotation shaft. The link and supporting shaft are joined by inserting a joint into an engaging hole of the link. The shapes of the outer circumferential surface of the joint and inner circumferential surface of the engaging hole are set so that the force exerted by the joint on the link due to the action of the outward force does not generate a moment assisting inclination when the link inclines.

1 Claim, 8 Drawing Sheets

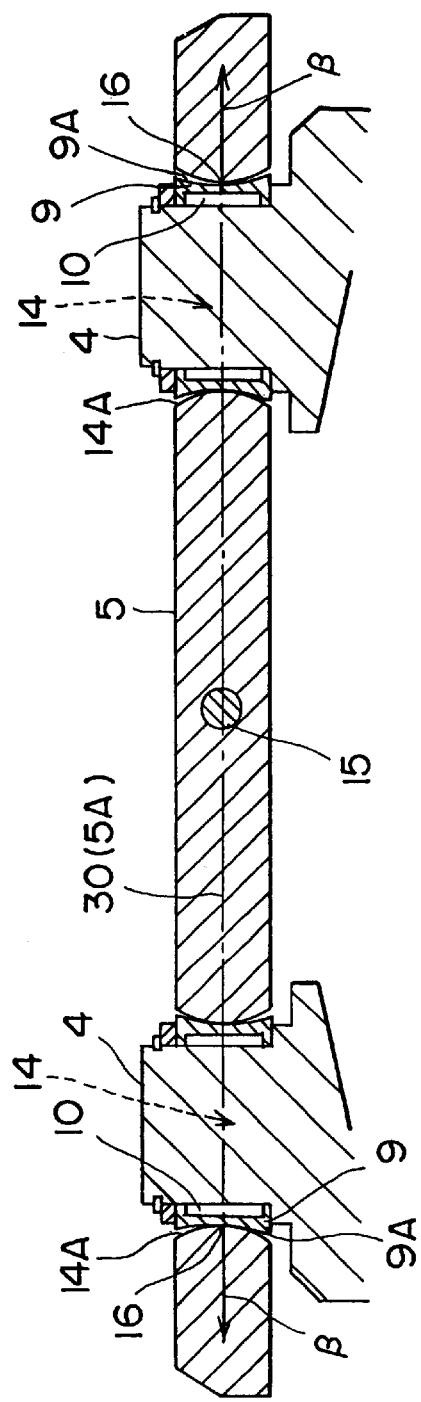
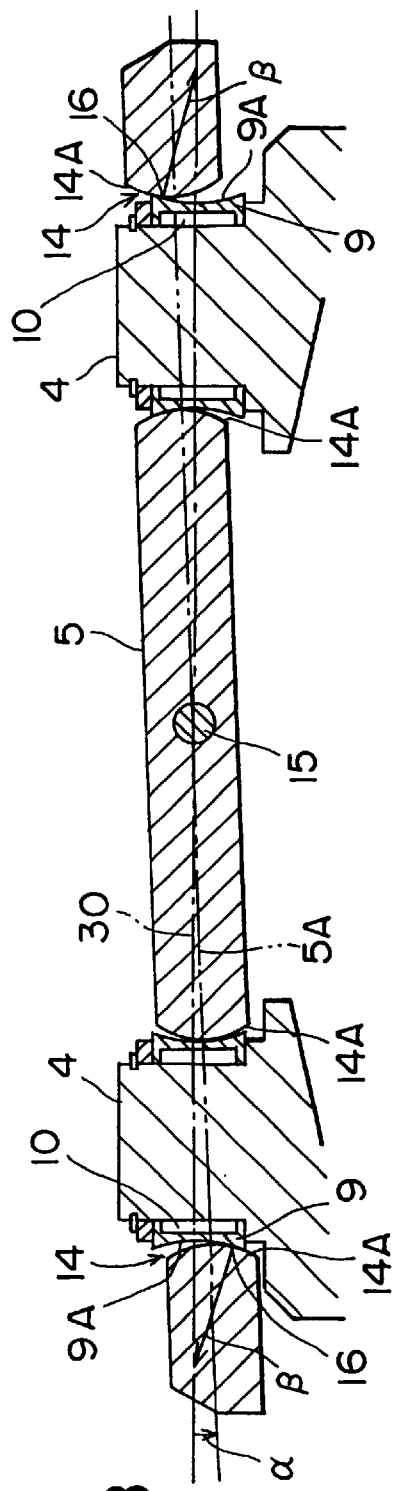

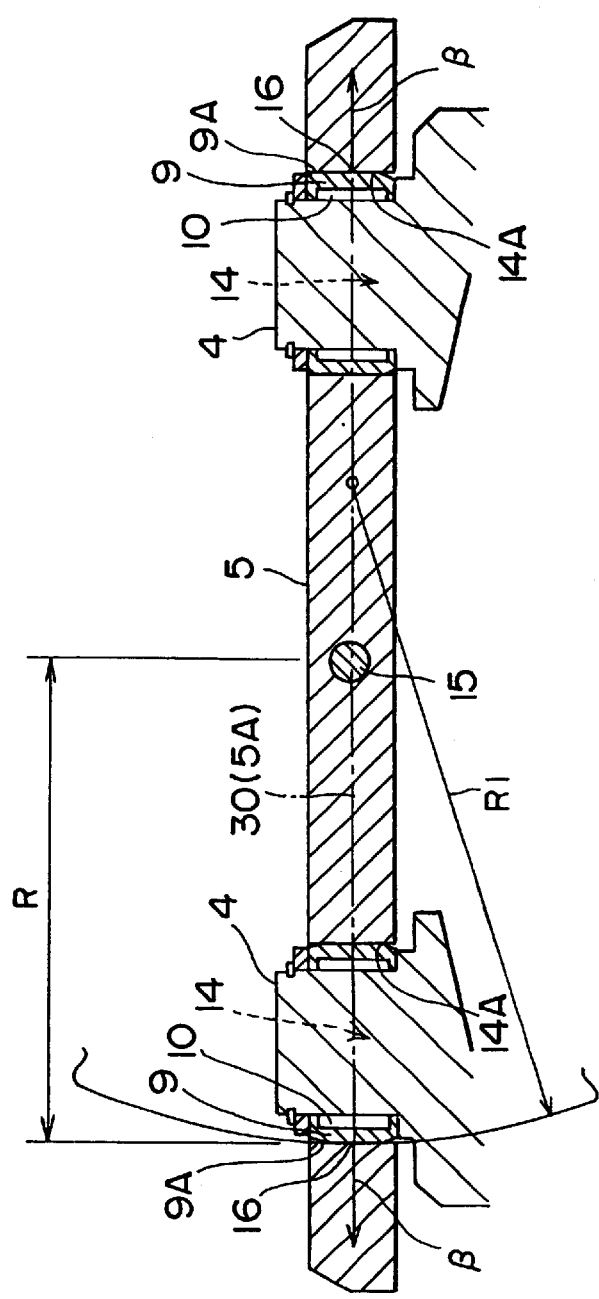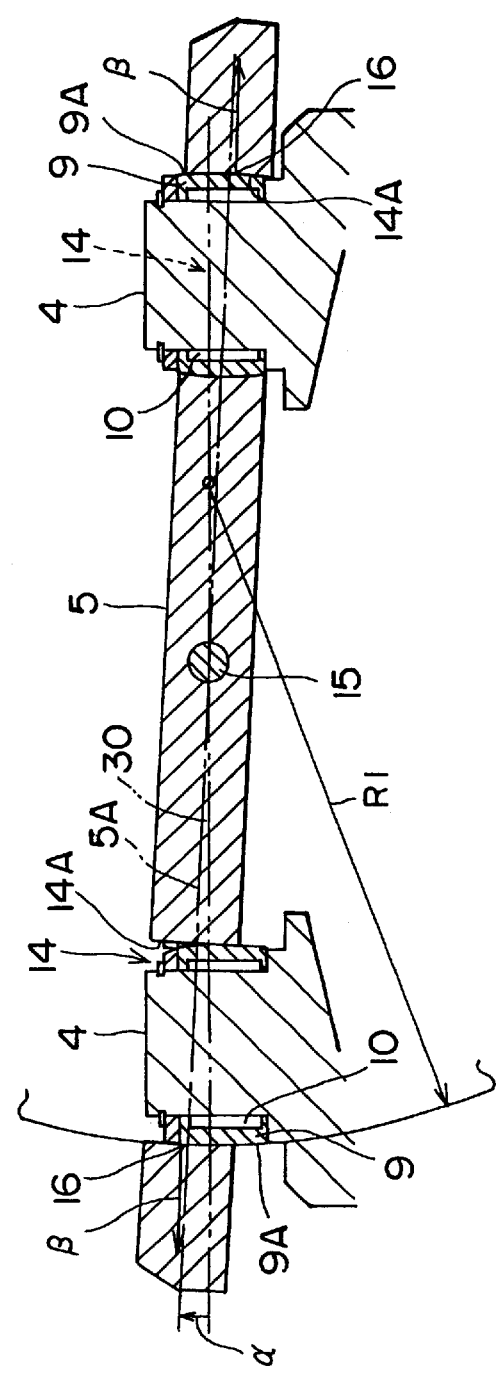
FIG.6A
FIG.6B

LINK CONNECTING STRUCTURE OF FRICTION WHEEL CONTINUOUSLY VARIABLE TRANSMISSION

This application is a divisional of U.S. application Ser. No. 09/527,464, filed Mar. 17, 2000, and is incorporated herein by reference.

FIELD OF THE INVENTION

This invention relates to a joint structure of friction wheel support components of a friction wheel continuously variable transmission such as a toroidal continuously variable transmission, and a link connecting them.

BACKGROUND OF THE INVENTION

Tokkai Hei 9-291997 and Tokkai Hei 9-317837 which the Japanese Patent Office published in 1997 disclose a toroidal continuously variable transmission as one example of a friction wheel continuously variable transmission.

In this toroidal continuously variable transmission, torque is transmitted between an input disk and an output disk via a pair of power roller which are friction wheels gripped by the input disk and output disk. The power rollers are respectively supported free to rotate by trunnions, and when a trunnion is driven in a perpendicular direction to the rotation axis of the input disk, the force which the power roller receives from the input disk and output disk varies, and the power roller varies its orientation. around a trunnion shaft together with the trunnion. The orientation of the power roller is expressed as a gyration angle. A variation of the gyration angle of the power roller causes a variation in the radii of the contact points between the power roller, input disk and output disk, and a speed ratio, which is a ratio of the rotation speeds of the input disk and output disk, therefore varies continuously.

SUMMARY OF THE INVENTION

In order to synchronize the gyration angles of the pair of power rollers, the trunnions supporting the power rollers must be displaced in mutually opposite directions. For this reason, the upper ends of the trunnion shafts are joined by an upper link, and the lower ends are joined by a lower link. An engaging hole is formed in each link, and a spherical joint fixed to the outer circumference of the trunnion shaft engages with these engaging holes. The midparts of the upper link and lower link are respectively supported by pins, and the links pivot on the pins according to the axial displacement of the trunnion.

A load acts on the power roller gripped by the input disk and output disk in a direction tending to push it away from the rotation axis, and a force is exerted on the trunnion in the same direction.

A link has the role of holding the trunnion at a predetermined distance from the rotation axis against this load. Therefore, the farthest point on the outer circumference of the spherical joint from the pin is always horizontally pushed toward the engaging hole.

When the link pivots and inclines from the horizontal position, the acting point of the pushing force is offset from the center line of the link, and exerts a moment on the link. It is undesirable that this moment assists the inclination of the link so that the link collides with other components of the trunnion.

It is therefore an object of this invention to prevent the trunnion from exerting a moment that promotes a further inclination of the link, when the link inclines.

In order to achieve the above objects, this invention provides a joint structure which joins a link and a supporting shaft of such a friction wheel continuously variable transmission that comprises an input disk and output disk arranged on a rotation shaft, a pair of friction wheels gripped between the input disk and the output disk, and supporting members supporting the friction wheels.

Each of the supporting members comprises the supporting shaft perpendicular to the rotation shaft. The link connects one end of the supporting shaft of one of the supporting members to one end of the supporting shaft of another supporting member, and supporting the supporting members against an outward force exerted by the friction wheels in a direction away from the shaft. The link is supported by a pin so as to be free to pivot.

The joint structure according to this invention comprises a joint fitted to the supporting shaft, and an engaging hole formed in the link into which the joint is inserted. The engaging hole comprises an inner circumferential surface, the joint comprises an outer circumferential surface in contact with the inner circumferential surface, and the outer circumferential surface and inner circumferential surface have a longitudinal sectional shape such that the force exerted by the outer circumferential surface on the inner circumferential surface due to the outward force does not generate a moment assisting inclination when the link inclines.

The details as well as other features and advantages of this invention are set forth in the remainder of the specification and are shown in the accompanying drawings.

BRIEF DESCRIPTION OF THE DRAWINGS

FIGS. 5A and 5B are similar to FIGS. 3A and 3B, but showing a third embodiment of this invention.

FIGS. 6A and 6B are similar to FIGS. 3A and 3B, but showing a fourth embodiment of this invention.

DESCRIPTION OF THE PREFERRED EMBODIMENTS

Figure 1:
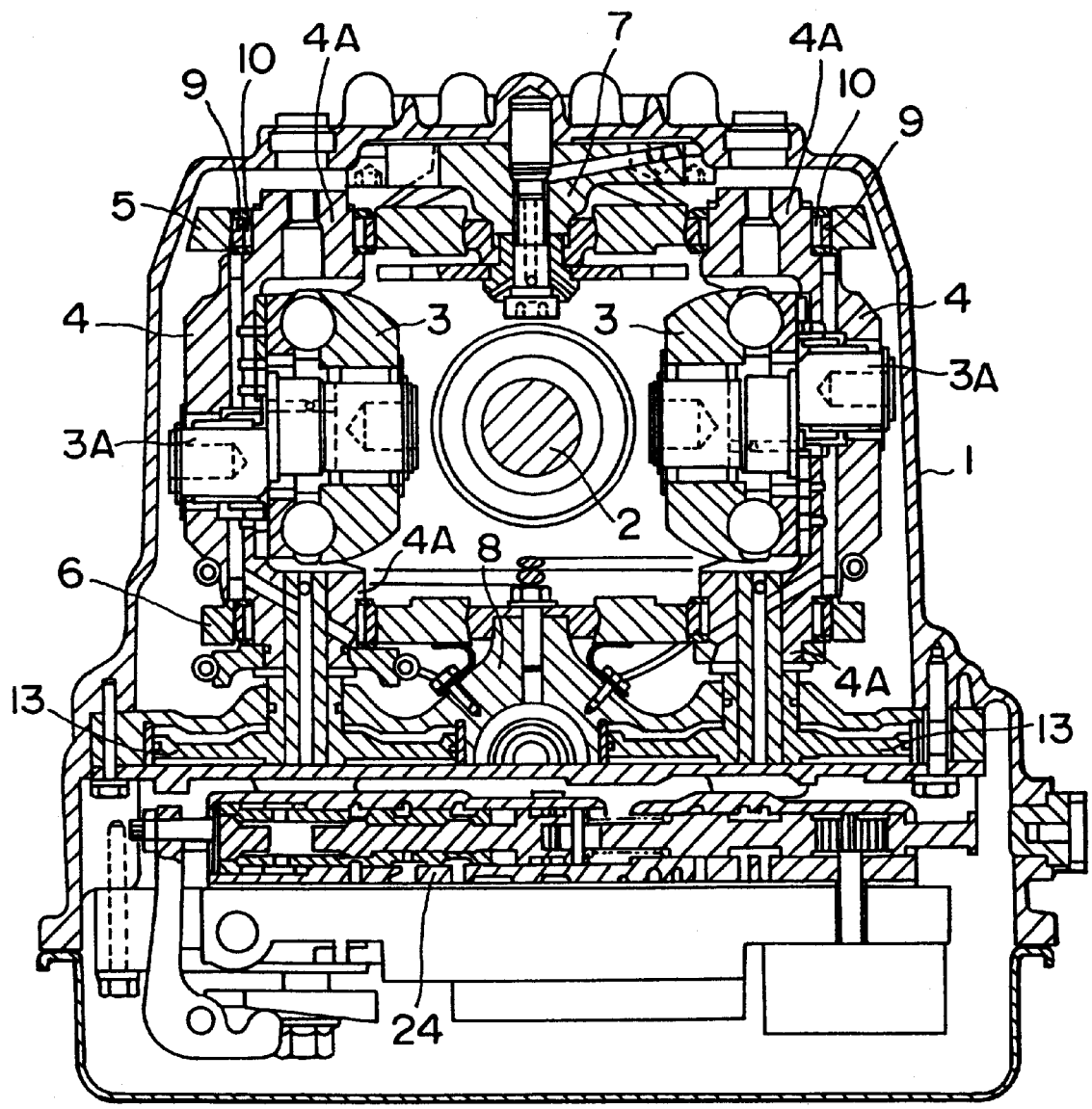
FIG. 1 is a cross-sectional view of a toroidal continuously variable transmission to which this invention is applied.

Referring to FIG. 1 of the drawings, a toroidal continuously variable transmission to which this invention is applied is provided with a pair of power rollers 3 on either side of an input shaft 2 in a case 1.

Figure 2:
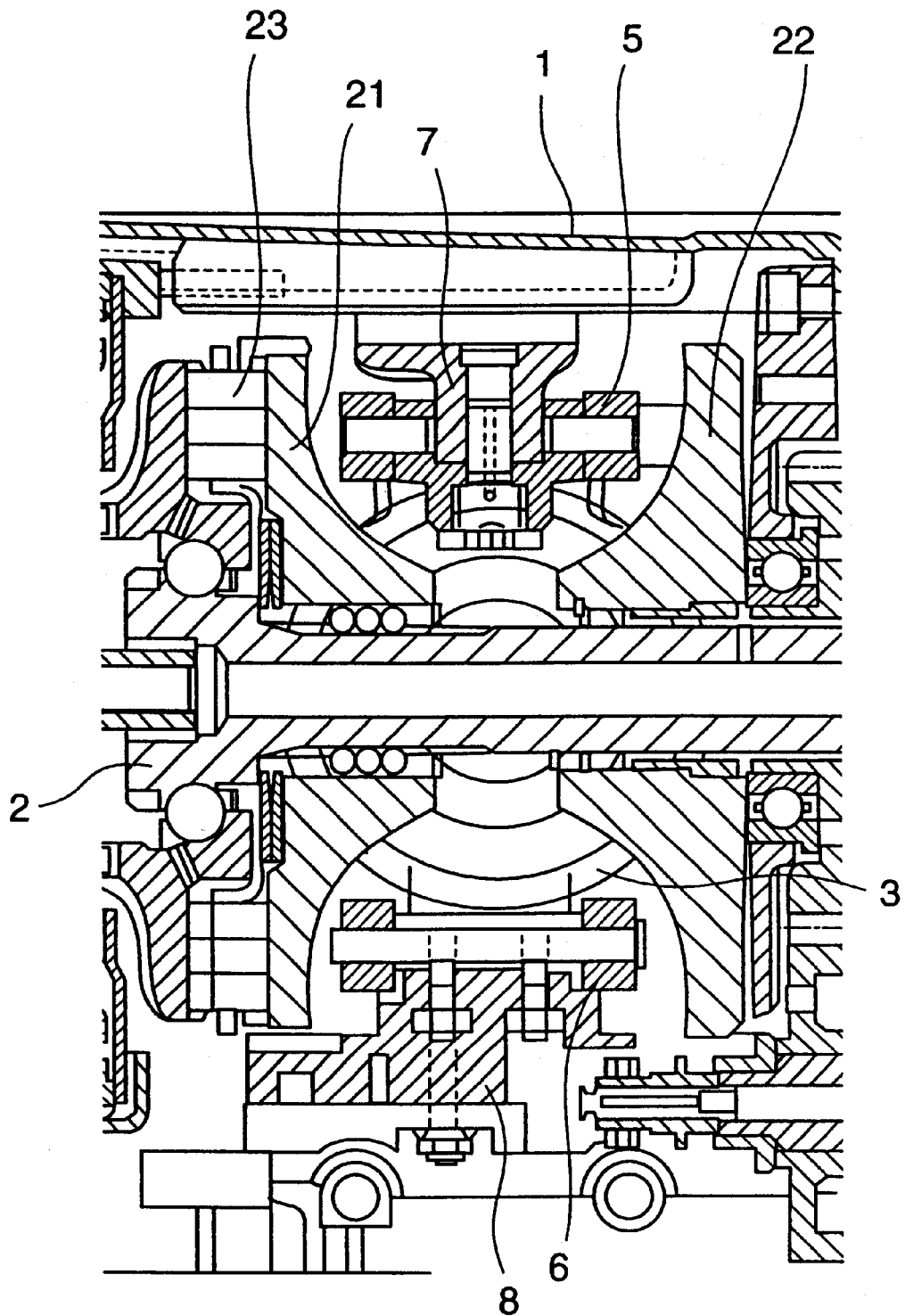
FIG. 2 is a longitudinal sectional view of the toroidal continuously variable transmission.

Referring to FIG. 2, an input disk 21 and output disk 22 are arranged relative to one another on an input shaft 2, and the input disk 21 and output disk 22 grip the power roller 3 due to the thrust force which cam rollers 23 exert on the input disk 21. The rotation torque of the input disk 1 is transmitted to the output disk 22 via the power rollers 3.

Referring again to FIG. 1, the power roller 3 is supported by a trunnion 4 via a crankshaft 3A. The trunnion 4 comprises a trunnion shaft 4A which extends in a vertical direction.

The upper ends of the trunnion shafts 4A are connected by an upper link 5, and the lower ends are connected by a lower link 6.

A piston 13 is joined to the lower end of the trunnions 4. An oil chamber is formed on both sides of the piston 13, and the piston 13 drives the trunnion 4 up and down according to the oil pressure supplied to these oil chambers from a control valve 24.

The oil pressure supply passage to each oil chamber is so arranged that the pair of trunnions 4 are always driven in opposite directions. The center of the upper link 5 connecting the trunnions 4 is supported free to pivot in the case 1 by a pin 15 shown in FIGS. 3A and 3B. The pin 15 is fixed to a support 7 in FIG. 1. The lower link 6 is also supported in a similar fashion in the case 1 by a pin and a support 8. The pair of trunnions 4 therefore synchronously displace in mutually opposite directions perpendicular to the input shaft 2, i.e., in the upward/downward direction in FIG. 1.

Thus, when the trunnion 4 displaces, the contact points of the power roller 3 with the input disk 21 and output disk 22 is offset from the input shaft 2, and the power roller 3 rotates together with the trunnion 4 around the trunnion shaft 4A due to the component force exerted by the disks 21 and 22 on the power roller 3 in the left and right directions of FIG. 1. Consequently, the contact radii between the power roller 3, input disk 21 and output disk 22 vary, and the speed ratio of the input disk 21 and output disk 22, i.e., the speed ratio of the transmission, varies continuously.

Figure 3A:
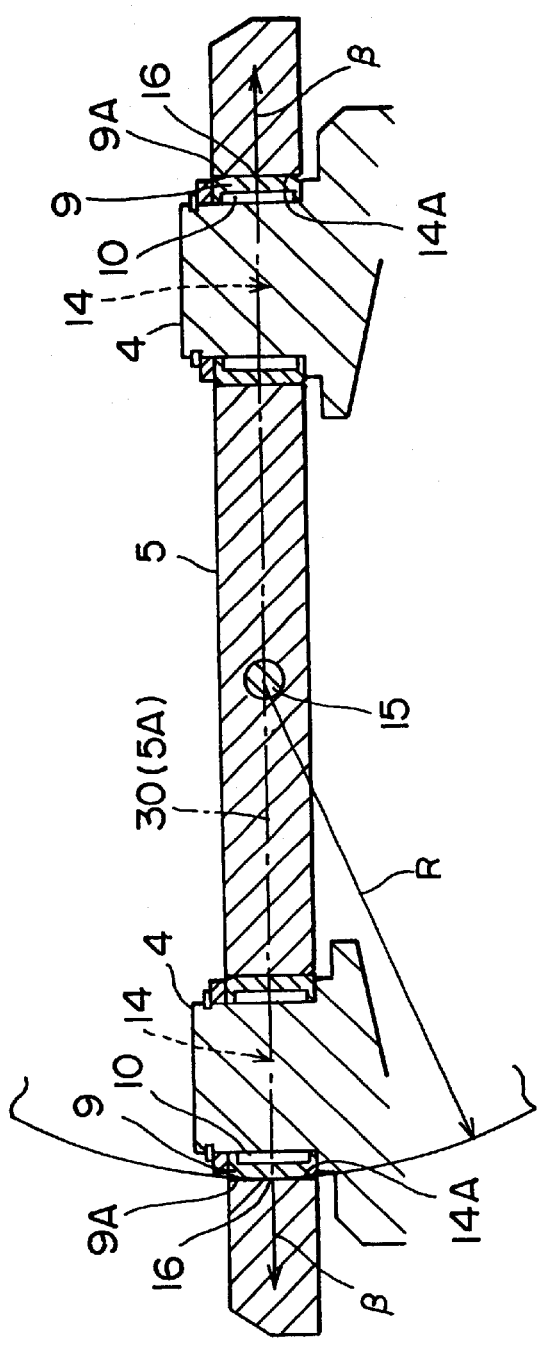
FIGS. 3A and 3B are cross-sectional views of the essential parts of the toroidal continuously variable transmission showing the joint construction of a link and a trunnion according to this invention.

Next, referring to FIG. 3A of the drawings, a pair of through holes 14 of uniform diameter are formed in the upper link 5. A spherical joint 9 of the upper end of the trunnion shaft 4A engages with the engaging hole 14. The joint 9 is fitted to the upper end of the trunnion shaft 4A via a needle bearing 10.

An inner circumferential surface 14A of the engaging hole 14 is formed in a cylindrical shape. On the other hand, an outer circumference 9A of the joint 9 which comes in contact with the inner circumferential surface 14A is formed in a barrel shape, i.e., a longitudinal section of the outer circumference 9A has a convex portion. The curvature radius of the convex portion is set equal to a distance R from the pin 15 to the farthest point of the outer circumference 9A.

The joint between the trunnion shaft 4A and lower link 6 comprises the same engaging hole and spherical joint as those of the joint between the trunnion shaft 4A and upper link 5.

During torque transmission, the input disk 21 and output disk 22 exert loads on the trunnions 4 in a direction away from the input shaft 2 according to the thrust force, i.e., a load toward the left on the left trunnion 4 and a load toward the right on the right trunnion 4 of FIG. 1. As a result, the outer circumferential surface 9A of the joint 9 exerts a horizontal force $\beta$ on the inner circumferential surface 14A of the engaging hole 14, as shown in FIG. 3A. The point of action 16 of the force $\beta$ coincides with the intersection point between a center line 5A of the upper link passing through the center of the pin 15 and the inner circumferential surface 14 of the engaging hole 14. When the upper link 5 is not inclined, the center line 5A coincides with a horizontal line 30.

Figure 3B:
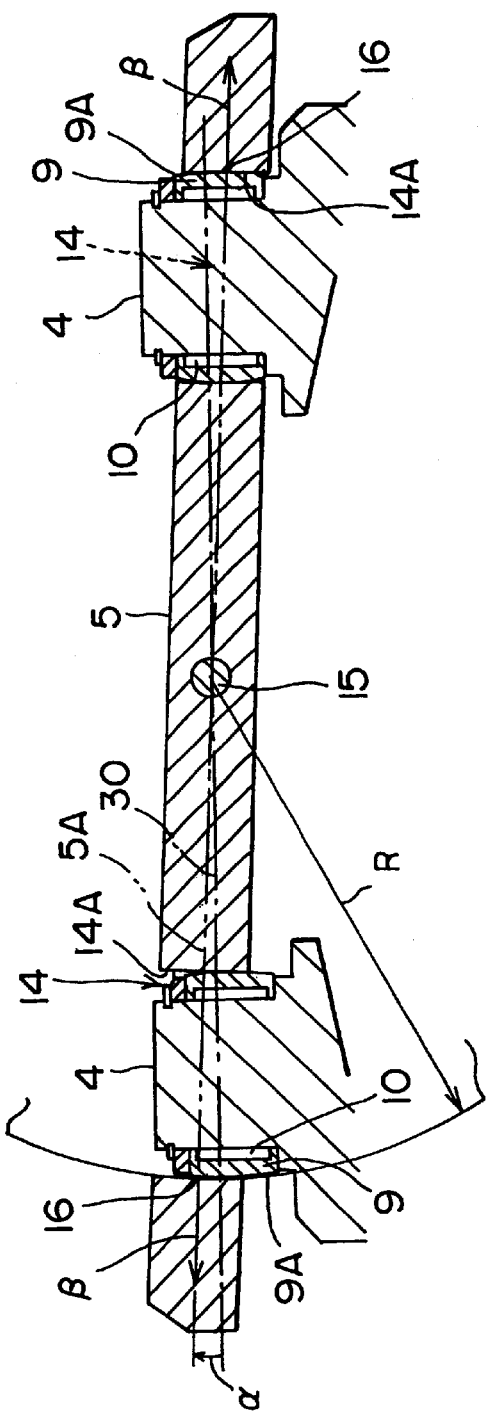

Next, the case will be considered where the upper link 5 pivots around the pin 15 and is inclined, as shown in FIG. 3B.

Herein, the center line 5A makes an angle $\alpha$ with the horizontal line 30. The inner circumferential surface 14A of the engaging hole 14 in contact with the outer circumferential surface 9A displaces along an arc of radius R, but the curvature of the outer circumferential surface 9A is also the radius R. Therefore, the contact point between the inner circumferential surface 14A of the engaging hole 14 and the outer circumferential surface 9A, i.e., the point of action 16, always coincides with the intersection of the center line 5A and inner circumference surface 14A regardless of the inclination angle $\alpha$ of the upper link 5.

The force exerted by the joint 9 on the upper link 5 acts in a horizontal direction, and this force decomposes into a force component $\beta$ in the direction of the center line 5A of the upper link 5, and a force component acting on the inner circumferential surface 14A perpendicularly to the center line 5A. As the joint 9 and inner circumferential surface 14A are arranged so that they can slip relative to each other, the force component acting on the inner circumferential surface 14A perpendicularly to the center line 5A does not exert a moment on the upper link 5. Also, the force component $\beta$ acts on the center line 5A, so the force component $\beta$ also does not exert a moment on the upper link 5.

Figure 8:
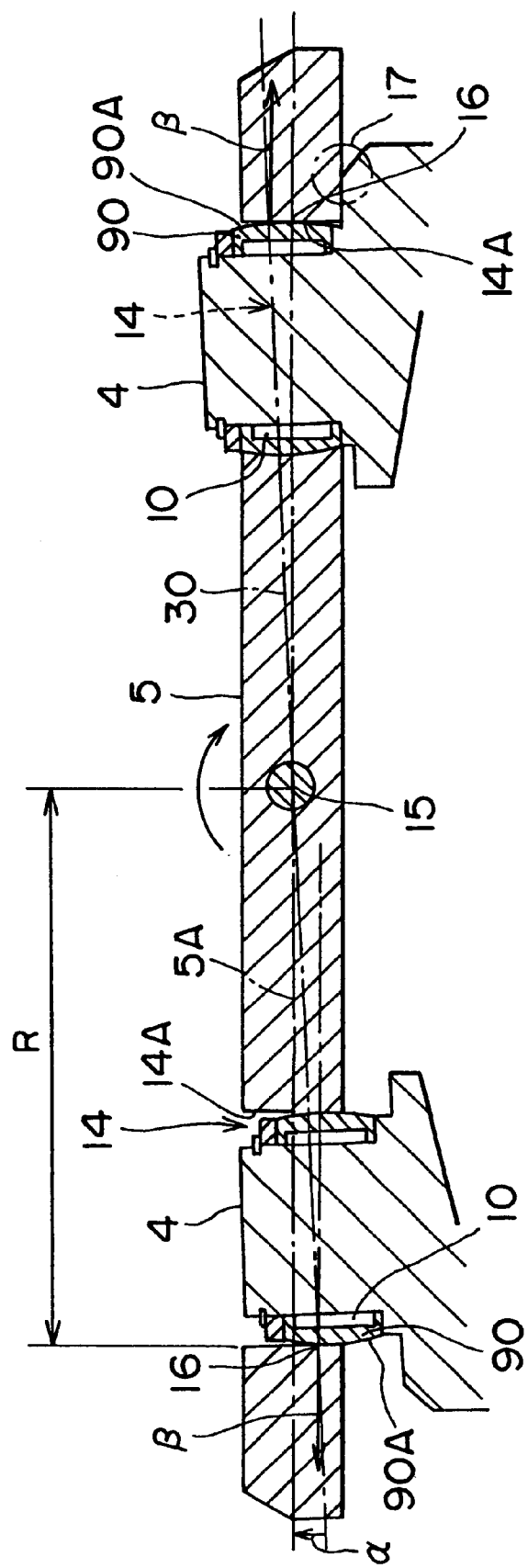
FIG. 8 is a cross-sectional view of the essential parts of a toroidal continuously variable transmission showing a prior art joint construction of a link and a trunnion.

In contrast to this, in a prior art spherical joint shown in FIG. 8, when the curvature of the outer circumferential surface 90A is arranged to be less than the radius R, the contact point between a barrel-shaped spherical joint 90 and the inner circumferential surface 14A is offset from the center line 5A according to the inclination of the upper link 5. As a result, the force component $\beta$ exerts a moment in the clockwise direction of the figure on the upper link 5. This promotes the further inclination of the upper link 5, so the upper link 5 and trunnion 4 collide at a site shown by a part 17 in the figure. However, according to the construction of the upper link 14 and joint 9 shown in FIGS. 3A and 3B, such a moment is not exerted on the upper link 5, and the trunnion 4 does not assist the inclination of the upper link 5.

Next, a second embodiment of this invention will be described referring to FIGS. 4A and 4B.

According to this embodiment, instead of the spherical joint 9 coming in contact with the cylindrical inner circumferential surface 14A of the engaging hole 14, the vertical cross-section of the inner circumferential surface 14A is expanded toward the center in an arc shape, and the outer circumferential surface 9A of the joint 9 is formed in a cylindrical shape.

Figure 4A:
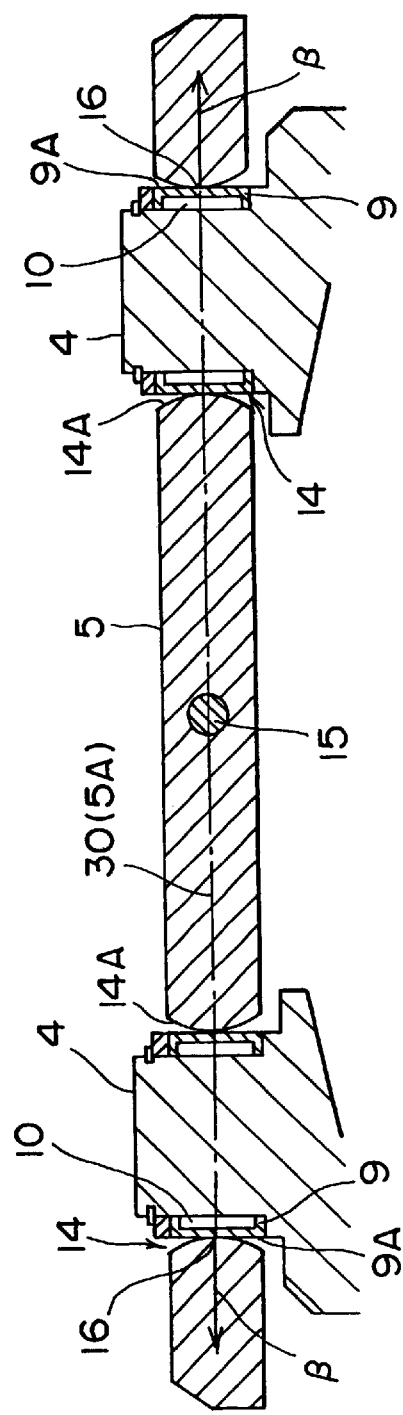
FIGS. 4A and 4B are similar to FIGS. 3A and 3B, but showing a second embodiment of this invention.

In this case also, when the upper link 5 is horizontal, the center line 5A of the upper link 5 coincides with the horizontal line 30, and the contact point between the joint 9 and inner circumferential surface 14A is situated on the center line 5A of the upper link 5, as shown in FIG. 4A. Therefore, the force $\beta$ exerted by the joint 9 on the upper link 5 acts on the center line 5A, so the joint 9 does not exert a moment on the upper link 5.

Figure 4B:
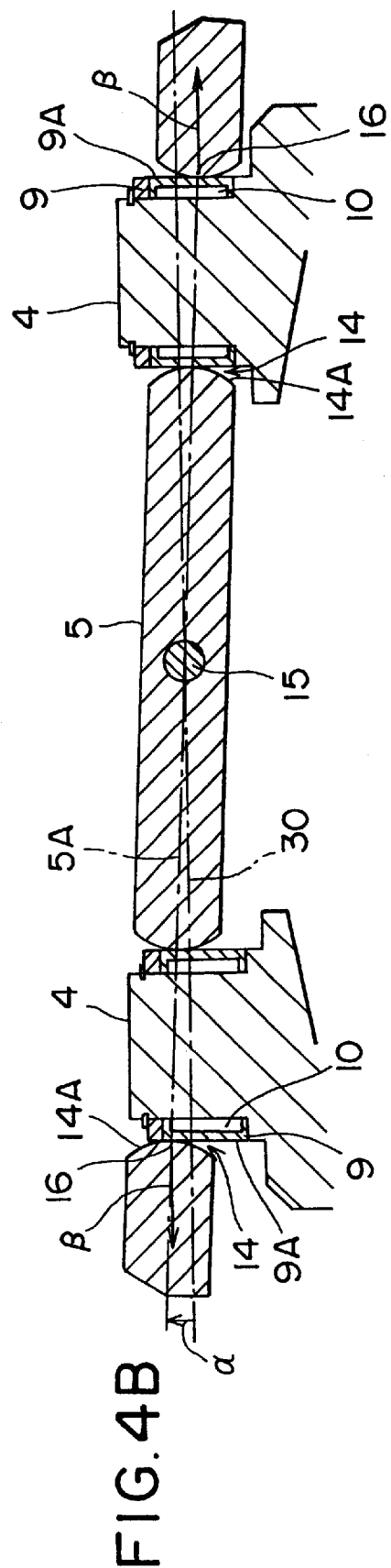

When the upper link 5 inclines as shown in FIG. 4B, the center line 5A undergoes a rotational displacement in the clockwise direction of the figure relative to the horizontal line 30. At the same time, the point of action 16 of the horizontal force exerted by the joint 9 on the left of the figure on the upper link 5 moves above the horizontal line 30. Likewise, the point of action 16 of the horizontal force exerted by the joint 9 on the right of the figure moves below the horizontal line 30.

Further, as the joint 9 has a cylindrical shape, the force $\beta$ exerted by the joint 9 on the upper link 5 acts in the direction of the normal to the outer circumferential surface 9A of the joint 9, i.e., in a horizontal direction.

Therefore, the force β exerts a moment in the figure on the upper link 5 in the anticlockwise direction around the pin 15, i.e., in a direction tending to restore the inclination of the upper link 5 to horizontal.

Since this moment opposes the inclination of the upper link 5, the inclination of the upper link 5 does not easily occur.

According to this embodiment, the outer circumferential surface 9A of the joint 9 was made cylindrical, and the inner circumferential surface 14A of the engaging hole 14 was expanded toward the center, so machining of the joint 9 is easy.

Next, a third embodiment of this invention will be described referring to FIGS. 5A and 5B.

According to this embodiment, as in the second embodiment, a longitudinal section of the inner circumference of surface 14A of the engaging hole 14 is formed to have a convex portion, and the outer circumferential surface 9A of the joint 9 is formed in the shape of a depression that has a concave longitudinal section.

The radius of the of the concave portion is set larger than the radius of the convex portion of the inner circumferential surface 14A.

In this case also, as shown in FIG. 5A, when the upper link 5 is horizontal, the center line 5A of the upper link 5 coincides with the horizontal line 30, and the contact point between the joint 9 and inner circumferential surface 14A is situated on the center line 5A of the upper link 5. Therefore, the force β exerted by the joint 9 on the upper link 5 acts on the center line 5A, and the joint 9 does not exert a moment on the upper link 5.

Next, the case will be considered where the upper link 5 is inclined as shown in FIG. 5B.

In this figure, the upper link 5 is inclined in an opposite direction to that of the aforesaid first embodiment and second embodiment.

Therefore, the center line 5A of the upper link 5 rotates in the anti-clockwise direction of the figure relative to the horizontal line 30. In this state, the contact point between the joint 9 on the left of the figure and the inner circumferential surface 14A of the engaging hole 14, i.e., the point of action 16 of the force β exerted by the joint 9 on the left of the figure on the upper link 5, moves below the horizontal line 30. The contact point between the joint 9 on the right of the figure and the inner circumferential surface 14A of the engaging hole 14, i.e. the point of action 16 of the force β exerted by the joint 9 on the right of the figure on the upper link 5, moves above the horizontal line 30.

It may be noted that the point of action 16 is situated on a line joining the center of an arc of the outer circumferential surface 9A of the joint 9, and the center of an arc of the inner circumferential surface 14A. Further, the direction of the force β coincides with a line joining the point of action 16 and the center of an arc of the outer circumferential surface 9A, i.e., with the normal to the outer circumferential surface 9A passing through the point of action 16.

Therefore, in this figure, the force β exerts a moment in the clockwise direction of the figure on the upper link 5. This moment tends to restore the inclination, of the upper link 5 to the horizontal, in other words opposing the inclination of the upper link 5.

Next, a fourth embodiment of this invention will be described referring to FIGS. 6A and 6B.

In this embodiment, the radius of the convex portion of the outer circumferential surface 9A of the joint 9 in the first embodiment is set to a value R1 larger than the distance R from the pin 15 to the furthest point on the outer circumferential surface 9A.

By setting the radius R1 of the convex portion of the outer surface 9A to be larger than the distance R, the point of action 16 of the force β exerted by the joint 9 on the left of FIG. 6B on the upper link 5 displaces slightly above the center line 5A, and the point of action 16 of the force β exerted by the joint 9 on the right on the upper link 5 displaces slightly below the center line 5A as the upper link 5 inclines clockwise relative to the horizontal line 30 in the figure.

As a result of this displacement of the point of action 16, the force β generates a moment which opposes the inclination of the upper link 5.

Figure 7:
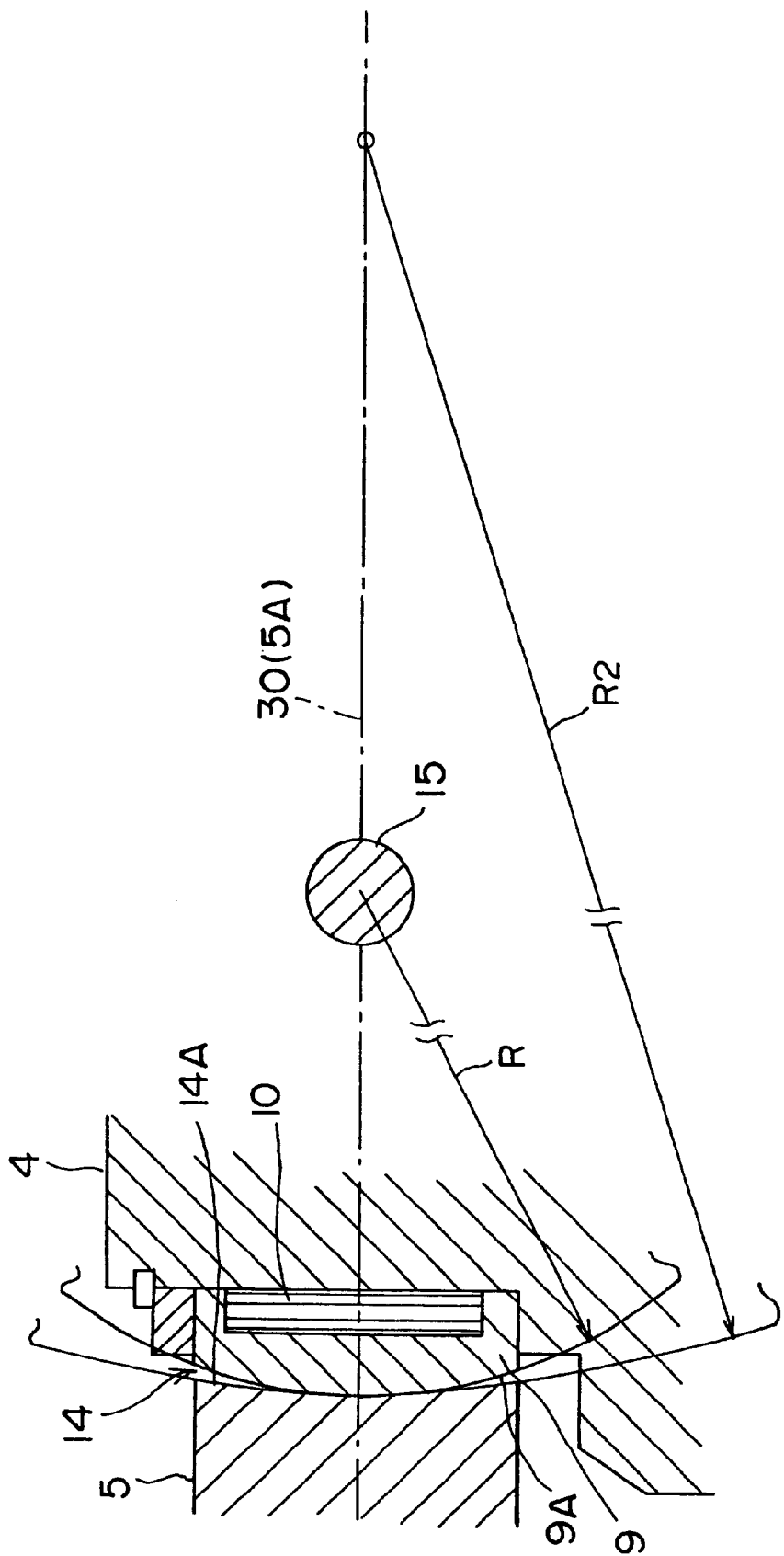
FIG. 7 is an enlarged cross-sectional view of a joint between the link and the trunnion according to a fifth embodiment of this invention.

Next, a fifth embodiment of this invention will be described referring to FIG. 7.

According to this embodiment, the longitudinal section of the inner circumferential surface 14A of the engaging hole 14 formed in the upper link 5 in the first embodiment is not straight but is formed to have a concave portion.

A radius R2 of the concave portion is set larger than the radius R of the outer circumferential surface 9A of the joint 9. In this case also, as in the fourth embodiment, the force β exerted by the joint 9 on the upper link 5 generates a moment opposing the inclination of the upper link 5.

In all the aforesaid embodiments, the joint between the upper link 5 and trunnion shaft 4A was taken as an example, but the description is identical for the joint between the lower link 6 and trunnion shaft 4A.

The contents of Tokugan Hei 11-76146, with a filing date of Mar. 19, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A joint structure which joins a link and a supporting shaft of a friction wheel continuously variable transmission, the transmission comprising an input disk and output disk arranged on a rotation shaft, a pair of friction wheels gripped between the input disk and the output disk, and supporting members supporting the friction wheels, each of the supporting members comprising the supporting shaft perpendicular to the rotation shaft, the link connecting one end of the supporting shaft of one of the supporting members to one end of the supporting shaft of another supporting member, and supporting the supporting members against an outward force exerted by the friction wheels in a direction away from the rotation shaft, the link being supported by a pin so as to be free to pivot, the joint structure comprising:

a joint fitted to the supporting shaft; and an engaging hole formed in the link into which the joint is inserted, wherein, the engaging hole comprises an inner circumferential surface, the joint comprises an outer circumferential surface in contact with the inner circumferential surface, and the outer circumferential surface and inner circumferential surface have a longitudinal sectional shape such that the force exerted by the outer circumferential surface on the inner circumferential surface due to the outward force does not generate a moment assisting inclination when the link inclines, and wherein, a longitudinal section of the inner circumferential surface of the engaging hole is formed to have a convex portion, a longitudinal section of the outer circumferential surface of the joint is formed to have a concave portion, and a radius of the concave portion is set to be larger than a radius of the convex portion.

* * * * *